US009309401B2

(12) United States Patent
Mohanty et al.

(10) Patent No.: US 9,309,401 B2
(45) Date of Patent: Apr. 12, 2016

(54) LIGNIN BASED MATERIALS AND METHODS OF MAKING THOSE

(76) Inventors: Amar Kumar Mohanty, Guelph (CA); Manjusri Misra, Guelph (CA); Saswata Sahoo, Guelph (CA)

(*) Notice: Subject to any disclaimer, the term of this patent is extended or adjusted under 35 U.S.C. 154(b) by 147 days.

(21) Appl. No.: 13/375,429

(22) PCT Filed: Jun. 1, 2010

(86) PCT No.: PCT/CA2010/000822
§ 371 (c)(1),
(2), (4) Date: Nov. 30, 2011

(87) PCT Pub. No.: WO2010/139056
PCT Pub. Date: Dec. 9, 2010

(65) Prior Publication Data
US 2012/0071591 A1    Mar. 22, 2012

Related U.S. Application Data

(60) Provisional application No. 61/213,340, filed on Jun. 1, 2009.

(51) Int. Cl.
| | |
|---|---|
| C08L 67/02 | (2006.01) |
| C08L 97/00 | (2006.01) |
| C08L 97/02 | (2006.01) |
| C08G 18/36 | (2006.01) |
| C08G 18/64 | (2006.01) |
| C08G 18/76 | (2006.01) |
| C08K 5/315 | (2006.01) |
| C08L 67/04 | (2006.01) |
| C08L 91/00 | (2006.01) |

(52) U.S. Cl.
CPC .................. *C08L 67/02* (2013.01); *C08G 18/36* (2013.01); *C08G 18/6492* (2013.01); *C08G 18/7664* (2013.01); *C08L 97/005* (2013.01); *C08L 97/02* (2013.01); *C08K 5/315* (2013.01); *C08L 67/04* (2013.01); *C08L 91/00* (2013.01); *C08L 2201/06* (2013.01); *C08L 2205/02* (2013.01)

(58) Field of Classification Search
CPC ........ C08L 67/02; C08L 97/005; C08L 97/02
USPC .......................................................... 524/72
See application file for complete search history.

(56) References Cited

U.S. PATENT DOCUMENTS

| | | | | |
|---|---|---|---|---|
| 2,844,549 A * | 7/1958 | Provost | ........................... | 524/76 |
| 3,355,400 A * | 11/1967 | Smith et al. | ....................... | 524/72 |
| 3,991,022 A * | 11/1976 | Dimitri | .......................... | 523/330 |
| 4,477,612 A * | 10/1984 | Boutsicaris | ....................... | 524/76 |
| 4,803,255 A * | 2/1989 | Pruett et al. | .................... | 527/400 |
| 5,321,065 A * | 6/1994 | Bono et al. | ........................ | 524/76 |
| 6,599,966 B2 * | 7/2003 | Penning et al. | ................ | 524/156 |
| 6,863,971 B2 * | 3/2005 | Halahmi et al. | ......... | 428/311.71 |
| 7,354,656 B2 * | 4/2008 | Mohanty et al. | .............. | 428/523 |
| 7,445,835 B2 * | 11/2008 | Serizawa et al. | ............ | 428/297.4 |
| 2003/0030176 A1 * | 2/2003 | Monovoukas et al. | ........ | 264/211 |
| 2003/0046772 A1 * | 3/2003 | Halahmi et al. | ............. | 8/115.51 |
| 2005/0058822 A1 * | 3/2005 | Ittel | ............................ | 428/304.4 |
| 2006/0135668 A1 * | 6/2006 | Hayes | ........................... | 524/430 |
| 2006/0147695 A1 * | 7/2006 | Serizawa et al. | ............ | 428/297.4 |
| 2009/0099300 A1 * | 4/2009 | Gallucci et al. | .............. | 524/592 |
| 2009/0171037 A1 * | 7/2009 | Aoshima et al. | .............. | 525/418 |
| 2012/0220680 A1 * | 8/2012 | Bastioli et al. | ................ | 521/182 |

FOREIGN PATENT DOCUMENTS

| | | |
|---|---|---|
| CA | 2266371 | 3/1998 |
| CA | 2621184 | 3/2007 |
| JP | 2002114896 A * | 4/2002 |

OTHER PUBLICATIONS

Ishiaku et al. Journal of Polymers and the Environment, vol. 13(2), 2005, 151-157).*
Machine Translaion of JP 2002114896, 2013.*
Shibata et al., Macromol. Mater. Eng. 2003, 288, 35-43.*
Dash et al. (Journal of Biobased Materials and Bioenergy, vol. 2, No. 3, 2008, p. 273-281).*
Li, Jianchun et al, Thermal and mechanical properties of biodegradable blends of poly (L-lactic acid) and lignin, Polymer International, 2003, p. 949-955, vol. 52, Society of . . . .
Shigematsu, Mikiji et al, Enhancement of miscibility between hemicellulose and lignin by addition of their copolymer . . . , Macromol. Chem. Phys., 1994, p. 2827-2837, vol. 195.
Kumar, M. N. Satheesh et al, Lignin and Its Applications with Polymers, Journal of Biobased Materials and Bioenergy, 2009, p. 1-24, vol. 3, American Scientific Publishers, USA.
Setua, D. K. et al, Lignin reinforced Rubber Composites, Polymer Composites, Dec. 2000, p. 988-995, vol. 21, No. 6, Society of Plastics Engineers.
Rozman, H.D. et al, Preliminary Studies on the Use of Modified ALCELL Lignin as a Coupling Agent in the Biofiber Composites, Journal of Appl. Polymer Science, 2001, p. 1333, 81.
Acha, B. A. et al, Lignin in Jute Fabric-Polypropylene Composites, Journal of Applied Polymer Science, 2009, p. 1480-1487, vol. 113, Wiley Periodicals, Inc.
Baumberger, S. et al, Utilization of Pine Kraft Lignin in Starch Composites: Impact of Structural Heterogeneity, J. Agric. Food Chem.,1998, p. 2234-2240, vol. 46, American Chem.

(Continued)

*Primary Examiner* — Liam J Heincer
(74) *Attorney, Agent, or Firm* — Eduardo Krupnik; Muer Thomson LLP

(57) ABSTRACT

The present invention relates to plastic materials comprising lignin and poly(butylene succinate) (PBS) to methods of manufacturing those plastic materials and to articles obtained by molding the plastic materials of the invention. Since PBS can be obtained from renewable sources, the present invention also provides for bioplastic materials comprising lignin and PBS. The present invention also provides for plastic materials comprising lignin and PBS and at least one fiber and to articles obtained from those plastic materials that are degradable, compostable and recyclable.

20 Claims, 3 Drawing Sheets

(56) References Cited

OTHER PUBLICATIONS

Raquez, Jean-Marie et al, Recent Advances in Reactive Extrusion Processing of Biodegradable Polymer-Based Compositions, Macromol. Mater. Eng., 2008, p. 447-470, vol. 293.

Weihua, Kai et al, Effect of Lignin Particles as a Nucleating Agent on Crystallization of Poly(3-hydroxybutyrate), Journal of Appl. Poly. Science, 2004, p. 2466-2474, vol. 94.

Graupner, Nina, Application of lignin as natural adhesion promoter in cotton fibre-reinforced poly(lactic acid) (PLA) composites, Journal of Mat. Sci., 2008, p. 5222-5229, 43.

Lee, Sangmook et al, Characterization and processing of Biodegradable polymer blends of poly(lactic acid) . . . , Korea-Australia Rheology Journal, 2005, p. 71-77, vol. 17, No. 2.

Burgueno, Rigoberto et al, Hybrid biofiber-based composites for structural cellular plates, Composites: Part A, 2008, p. 581-593, vol. 36.

Huda, M.S. et al, The effect of silane trated- and untreated-talc on the mechanical and physico-mechanical and physio-mechanical . . . , Composites: Part B, 2007, p. 367-379, vol. 38.

Singh, Sanjeev et al, Biodegradable Green Hybrid Composites from Bacterial Bioplastic, Aiche Annual Meeting, 2007, http://aiche.confx.com/aiche/2007/techprogram/P96595.HTM.

Panthapulakkal, Suhara et al, Injection-Molded Short Hemp Fiber/Glass Fiber-Reinforced Polypropylene Hybrid Composites . . . , J. Appl. Polym. Sci., 2007, p. 2432-2441, vol. 103.

Kuan, Chen-Feng et al, Preparation and characterization of the novel water-crosslinked cellulose reinforced poly(butylene succinate) . . . , Composites Sci & Tech, 2006, p. 2231, 66.

Liu, Lifang et al, Mechanical properties of poly(butylene succinate) (PBS) biocomposites reinforced with surface modified jute fibre, Composites: Part A, 2009, p. 669-674, v 40.

Lee, Sang Muk et al, Novel silk/poly(butylene succinate) biocomposites: the effect of short fibre content on their mechanical . . . , Composites Sci and Tech, 2005, p. 647-657, v 65.

Van Den Oever, M. J. A. et al, Switchgrass (*Panicum virgatum* L.) as a reinforcing fibre in polypropylene composites, J. of Materials Sci., 2003, p. 3697-3707, vol. 38.

Micusik, Matej et al, Effect of crosslinking on the properties of composites based on LDPE and conducting organic filler, European Polymer Journal, 2006, p. 2379-2388, vol. 42.

Jiang, Long et al, Reinforcing and Toughening Effects of Bamboo Pulp Fiber on Poly (3-hydroxybutyrate-co-3-hydroxyvalerate) Fiber Composites, Ind. Eng. Chem, 2010, p. 572-577, 49.

Chen, Feng et al, Performance Enhancement of Poly(lactic acid) and Sugar Beet Pulp Composites by Improving Interfacial Adhesion . . . , Ind. Eng. Chem. Res., 2008, p. 8667-8675, 47.

Jacob John, Maya et al, Ch. 12: Hybrid Composite, Natural fiber reinforce polymer composites: macro to nonscale, 2009, p. 315-328, Fibers and Textiles, General Scince, Eng.

Ferreira, B. M. P. et al, Films of PLLA/PHBV: Thermal, Morphological, and Mechanical Characterization, J. Appl. Polymer Sci., 2002, p. 2898-2906, vol. 86.

Harada, Masaki et al, Increased Impact Strength of Biodegradable Ply(lactic acid)/Poly (butylene succinate) Blend Composites by . . . , J. Appl. Polym. Sci., 2007, p. 1813-1820, v106.

* cited by examiner

LIGNIN BASED MATERIALS AND METHODS OF MAKING THOSE

RELATED PRIORITY APPLICATION

This application claims the benefit of the filing date of U.S. Provisional Application No. 61/213,340, filed Jun. 1, 2009, the content of which is specifically incorporated herein by reference.

CROSS REFERENCE TO RELATED APPLICATIONS

This application is a national stage application under 35 U.S.C. §371 of International Application No. PCT/CA2010/000822, filed Jun. 1, 2010, which in turn claims the benefit under 35 U.S.C. §119(e) of U.S. Provisional Ser. No. 61/213,340, filed Jun. 1, 2009, the contents of each of which are hereby incorporated by reference into the present disclosure.

FIELD OF THE INVENTION

The present invention relates generally to the field of incorporating lignin to poly(butylene succinate) to create plastic materials. More particularly the present invention relates plastic material comprising lignin, grass fibers and poly(butylene succinate). The present invention also relates to articles obtained by molding the plastic materials of the present invention.

BACKGROUND OF THE INVENTION

Throughout this application, various references are cited in square brackets to describe more fully the state of the art to which this invention pertains. A list of these references is provided after the Examples. The disclosure of these references is hereby incorporated by reference into the present disclosure.

Lignin is the most abundant renewable resource next to cellulose and it is massively generated from the papermaking and emerging cellulosic ethanol industries. It is anticipated that upcoming ethanol biorefineries will generate large quantities of lignin (about 225 million tons in North America) with better chemical properties compared to paper pulp lignin (75 million tons) [3]. Lignin is a light weight (half the density of talc and calcium carbonate), stiff and brittle biopolymer, very little used as thermoplastic filler [1, 2].

About 2% of the lignin generated from the paper and biorefinery industries is used in value added applications, such as the isolation of chemicals, while the rest is used as low grade burning fuel [3]. Lignin also finds some application in adhesives and asphalts [4], chemicals synthesis, as phenol replacement in phenol-formaldehyde formulations, and in polyurethanes [3]. However, very limited studies have been made on the application of lignin in polymer composites or polymer blends. Lignin-polymer blends, lignin based polyurethane, lignin based epoxy composites, lignin-rubber composites and lignin thermoplastic composites have been reviewed by Kumar et al. [3]. Lignin has been used in the thermoplastic blends of polyethylene terephthalate (PET, polyethylene oxide (PEO) polypropylene (PP), Polyethylenes, polyvinyl alcohol (PVA), polystyrenes (PS), and Polyvinyl chloride (PVC). Lignin acts as a coupling agent depending upon the functionality of polymers [5]. Lignin is also used as a compatibilizer in jute fabric-PP composites [6]. Lignin incorporation slightly improved the PP-jute adhesion. It has been reported that lignin acts as a beta nucleating agent, fire retardant and toughening agent for neat PP. For a better economy and environmental sustainability, disposal and value added application of lignin should be considered critically.

A very limited study has been done on lignin based biodegradable polymer composites. Baumberger et al. [7] studied 20% lignin filled starch composites. Lignin, wood flour based polycaprolactone (PCL) composites has also been reported [8]. Maleic anhydride grafted PCL was used as a compatibilizer for improving tensile properties. However, nothing was mentioned on impact performance of composites. Lignin played a key role as nucleating agent in improving the thermal properties of lignin-polyhydroxy butyrate (PHB) composites [9, 2]. Lignin is also used as adhesion promoter in cotton fiber reinforced polylactic acid (PLA) composites [10]. Thermal and mechanical properties of lignin/Poly(L-lactic acid) (PLLA) blend have been studied by Li et al. [11]. Li, et al. reported a decrease in the tensile strength and elongation of blends with lignin incorporation. Li et al. reported that tensile modulus remained almost constant up to 20% lignin incorporation. Lignin accelerated thermal degradation when lignin content reached 20%. PLA and polyhydroxyalkanoates (PHAs) are the widely used biopolymers but they are facing challenges due to their inferior impact performance.

Blending of polymers [21-23] and/or hybridization of fillers [24-26] are interesting material science to improve properties of composites by balancing strength, stiffness and toughness. So, a binary or ternary blend of lignin with polymers with or without fiber reinforcement could be very promising in material applications.

There is still a need in the art to develop a low cost biodegradable material from polymer and lignin (primarily an industrial waste produced in large scale). The present invention meets the aforementioned needs by providing for a low cost bioplastic material comprising a polymer and lignin with improved mechanical and thermo-mechanical properties.

SUMMARY OF THE INVENTION

In one aspect the present invention provides for a plastic material comprising lignin and poly(butylene succinate) (PBS).

In another aspect the plastic material of the present invention is characterized in that said plastic material further comprises one or more additives.

In another aspect the plastic material of the present invention is characterized in that said plastic material further comprises one or more biofillers.

In another aspect the plastic material of the present invention is characterized in that said plastic material further comprises one or more additives and one or more biofillers.

In another aspect the plastic material of the present invention is characterized in that said one or more additives are selected from the group consisting of: epoxidized soy bean oil, polymeric diphenyl methane isocyanate (PMDI), Krasol®NN22 and Luperox® 101.

In another aspect the plastic material of the present invention is characterized in that said one or more biofillers include at least one grass fiber.

In another aspect the plastic material of the present invention is characterized in that said plastic material further comprises at least one grass fiber. In aspects of the present invention the at least one grass fiber is selected from the group consisting of switchgrass, *miscanthus*, hemp, jute and kenaf.

In another aspect the plastic material of the present invention is characterized in that said PBS is provided as a blend of PBS and poly(3-hydroxybutyrate-co-3-hydroxyvalerate) (PHBV).

In another aspect the plastic material of the present invention is characterized in that said plastic material further comprises polylactic acid (PLA).

In another aspect the plastic material of the present invention is characterized in that said plastic material comprises about 70% by weight lignin content or less.

In another aspect the plastic material of the present invention is characterized in that said plastic material comprises about 65% by, weight lignin content or less.

In another aspect the plastic material of the present invention is characterized in that said plastic material exhibits a simultaneous increase in mechanical and thermal properties of the plastic material with an increase of the lignin content in the plastic material.

In another aspect the plastic material of the present invention is characterized in that said plastic material exhibits a simultaneous increase in at least heat deflection temperature, storage modulus, tensile strength, tensile modulus, flexural strength and flexural modulus with an increase of the lignin content in the plastic material to up to about 65% by weight lignin content.

In another aspect the plastic material of the present invention is characterized in that said plastic material exhibits at least one of the following properties: flexural strength of about 35 MPa to about 75 MPa, tensile strength of about 25 MPa to about 45 MPa, tensile modulus of about 1 GPa to about 3.4 GPa, impact strength of about 10 J/M to about 60 J/M, storage modulus of about 1.22 GPa to about 3.8, flexural modulus of about 1 GPa to about 3.8 GPa and heat deflection temperature (HDT) of about 75 degrees Celsius to about 110 degrees Celsius.

In another aspect the plastic material of the present invention is characterized in that said plastic material exhibits impact strength of at least 60 J/M.

In another aspect the plastic material of the present invention is characterized in that said plastic material further comprises at least one compatibilizer, wherein said compatibilizer is selected from the group consisting of PMDI, titanate and silane.

In another aspect the plastic material of the present invention is characterized in that said plastic material further comprises epoxidized soy bean oil (ESO).

In another aspect the plastic material of the present invention is characterized in that said plastic material further comprises at least one grass fiber, PMDI and Krasol®NN22.

In another aspect the plastic material of the present invention is characterized in that said plastic material further comprises at least one grass fiber, PMDI and Luperox® 101.

In another aspect the plastic material of the present invention is characterized in that said plastic material further comprises at least one grass fiber, PMDI and ESO.

In another aspect the plastic material of the present invention is characterized in that said plastic material further comprises at least one grass fiber, PMDI, Krasol®NN22, and Luperox® 101.

In another aspect the plastic material of the present invention is characterized in that said plastic material further comprises at least one grass fiber, PMDI, ESO and Krasol®NN22.

In another aspect the plastic materials of the present invention are characterized in that said plastic materials are bioplastic materials.

The present invention also provides for degradable and compostable molded articles characterized in that said molded articles are obtained by molding the plastic material comprising lignin and PBS.

In one aspect the molded articles of the present invention are characterized in that the articles are in the form of a pellet, film or sheet.

In another aspect the molded articles of the present invention include: interior automotive parts, consumers and packaging products.

In one aspect the present invention provides for a method of controlling the mechanical and thermo-mechanical properties of a plastic material, wherein said material plastic comprises lignin and PBS, characterized in that said method comprises in increasing or reducing the lignin content of said plastic material thereby controlling the properties of the plastic material.

In another aspect of the present invention, the method of controlling the mechanical and thermo-mechanical properties of the plastic materials of the present invention is characterized in that said mechanical and thermo-mechanical properties include impact strength, HDT, storage modulus, tensile modulus, flexural strength tensile strength and tensile modulus.

In another aspect of the present invention, the method of controlling the mechanical and thermo-mechanical properties of the plastic material of the present invention is characterized in that two or more of the mechanical and thermo-mechanical properties are controlled simultaneously by increasing or decreasing the lignin content in the plastic material.

List of Advantages of the lignin-based plastic materials of the present invention include:

1. The present invention provides for a biodegradable, about 80-100% biobased (assuming PBS and epoxidized soy bean oil as biobased) sustainable material with significantly better properties than other biobased plastics currently in use.

2. The materials of the present invention are cost effective and superior performance compared to conventional commodity plastics like polypropylene (PP), polyethylenes (PE). Better impact performance compared to bioplastics like PLA, PHAs.

3. Cost/performance of the invented plastic materials is comparatively better and competitive with existing plastics. Environmental/social/economic benefits are the added advantages of the invented material.

4. The overall properties (tensile, flexural, Impact, storage modulus and HDT) of the lignin-based composites of the present invention simultaneously improve with increasing lignin content in the composite. No such significant, simultaneous improvement in overall properties has been reported in the literature of lignin-based composites.

5. The materials of the present invention are renewable, recyclable (about 3-7 times minimum), triggered biodegradable and compostable under composting conditions (stable under normal environmental conditions).

6. The materials of the present invention show faster degradation compared to virgin biodegradable polymer.

7. The materials of the present invention are light weight compared to talc and glass fiber (synthetic fiber) filled composites.

8. The materials of the present invention are easy to manufacture. They require similar melt processing techniques as other plastics, extrusion followed by injection molding which has been used for glass fiber or talc filled conventional plastic (PP, PE) composites.

9. The plastic materials of the present invention have superior properties compared to polypropylenes (tensile strength: 24-34 MPa, Flex Modulus: 0.83-1.38 GPa, Izode impact strength: 26.7-42.7 J/M, HDT: 75-104° C.).

10. Cost of switchgrass and *miscanthus* (about 5-6 cents/lb) is about ⅛-1/10 of the cost of other grass fibers like jute, hemp, kenaf, while the performance of the grass based composites of the present invention are nearly same as other biofiber based composites.

11. The market price of lignin ranges between $100 to $400 per ton. Incorporation of lignin into plastics not only will strengthen the economy of lignin producers (bioethanol and paper industries) but also will help plastic industries to use a low cost, light weight, environment friendly material that can provide some degree of self compatibilization depending the nature of polymers.

BRIEF DESCRIPTION OF THE DRAWINGS

The present invention will become more fully understood from the detailed description given herein and from the accompanying drawings, which are given by way of illustration only and do not limit the intended scope of the invention.

DETAILED DESCRIPTION OF THE INVENTION

Figure 1:
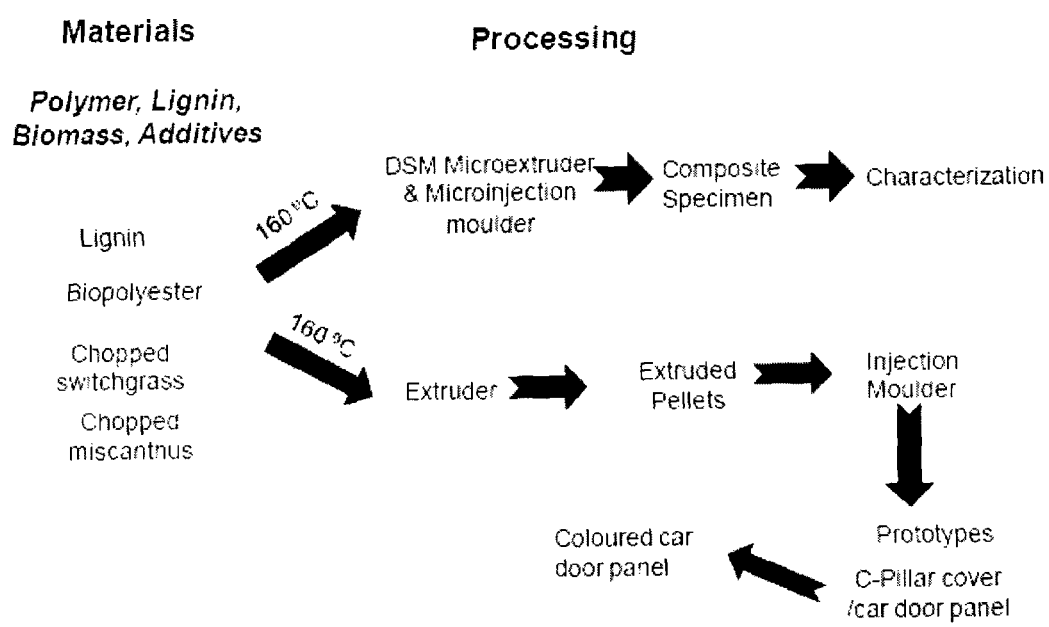
FIG. 1 illustrates some example ingredients and a schematic representation of the processing of bioplastic materials or composites of the present invention from those example ingredients.

Unless defined otherwise, all technical and scientific terms used herein have the same meaning as commonly understood by one of ordinary skill in the art to which this invention belongs. Also, unless indicated otherwise, except within the claims, the use of "or" includes "and" and vice-versa. Non-limiting terms are not to be construed as limiting unless expressly stated or the context clearly indicates otherwise (for example "including", "having" and "comprising" typically indicate "including without limitation"). Singular forms including in the claims such as "a", "an" and "the" include the plural reference unless expressly stated otherwise. In addition, although a few ingredients, chemicals or compounds are being referred to by their trademarks or trade names, it should be understood that the present invention is extended to the formulas or analogue formulas covered under those trademarks or trade names, and under any other trademark or trade name or general term that those formulas or analogue formulas may be known by.

ABBREVIATIONS

ASTM: The American Society for Testing & Materials.
ESO: epoxidized soy bean oil.
GPa: Gigapascals.
HDT: heat deflection temperature.
MPa: Megapascal.
PBS: poly(butylene succinate).
PLA: polylactic acid.
PHBV: poly(3-hydroxybutyrate-co-3-hydroxyvalerate).
PMDI: polymeric methylene diphenyl diisocyanate.

DEFINITIONS

"Additive" refers to plastic additives, which are a group of compounds for a variety of applications including: adhesion promoters, bonding agents, fillers, impact modifiers, plasticizers, stabilizers, compatibilizers, ultraviolet absorbers. Examples of additives include PMDI, Krasol®NN22, ESO and Luperox® 101.

"Biodegradable plastics" means plastics capable of being broken down (e.g. metabolized and/or hydrolyzed) by the action of microorganisms.

"Biofiller" means renewable filler, including lignin, switchgrass, and *miscanthus*.

"Bioplastic" means a plastic material that is derived from renewable biomass sources, including plants, vegetable oil, starch, microorganisms.

"Blend" means a homogeneous mixture of two or more different polymers/plastics. Lignin is considered a natural polymer.

"Compatibilizers" refers to any polymeric interfacial agent that facilitates formation of uniform plastic blends with desirable end properties. Examples of compatibilizers include PMDI.

"Degradable plastics" refers, for the purpose of this document, to plastics that can be decomposed or metabolized and/or hydrolized by any mechanism, including by microorganisms. As such, for the purpose of this document, degradable plastics include biodegradable plastics.

"Hybridization" means use of two or more reinforcing fillers (for example use of two or more biofibers, or lignin and one or more biofibers) together.

"Recyclable plastic" refers to a plastic-containing product that can be reprocessed into another, similar or often different, plastic-containing-products.

The ASTM defines "compostable plastic" as plastic "capable of undergoing biological decomposition in a compost site as part of an available program, such that the plastic is not visually distinguishable and breaks down to carbon dioxide, water, inorganic compounds, and biomass, at a rate consistent with known compostable materials (e.g. cellulose) and leaves no toxic residue."

The present invention provides for lignin-based plastic materials or composites, methods of manufacturing said lignin-based plastic materials or composites and to lignin-based molded products manufactured from those lignin-based plastic materials or composites. The plastic materials of the present invention comprise lignin and PBS.

Lignin, and its application in polymers, has been reviewed [3]. There is no literature on lignin based PBS or Polyhydroxy butyrate co-valerate (PHBV) bioplastic materials.

The inventors have been able to obtain plastic materials with up to 70% lignin incorporation. Thus, in aspects the plastic materials of the present invention comprise less than or equal to about 70% by weight lignin. With the use of one or more interface modifiers, e.g., surface active agent, to improve the interaction between the lignin and the PBS, more than 70% lignin incorporation to the PBS polymer may be possible. For example, use of ESO facilitates easy processability and allows more lignin incorporation to the PBS matrix.

The lignin-based plastic materials of the present invention are high performing; substantially moldable; can be triggered biodegradable; can be composted under composting conditions, but stable under normal environmental conditions; and can be recyclable (about 3-7 times minimum).

As such, in one aspect, the present invention provides for a moldable, triggered degradable, compostable and recyclable plastic material comprising lignin and PBS. In another aspect, the present invention provides for a moldable, triggered degradable, compostable and recyclable plastic material comprising lignin, PBS and PHBV.

The inventors discovered that the mechanical and thermo-mechanical properties of lignin/PBS plastic materials of the present invention simultaneously increase with increasing lignin content from about 0% to about 65% in PBS matrix (see Table 1 and Table 2 values for HDT, storage modulus, tensile modulus, flexural strength, tensile strength and flexural modulus). This simultaneous increase in at least the properties shown in Tables 9 and 2 constitute a unique feature of the novel lignin-based bioplastic blends of the present invention.

PBS is a biodegradable synthetic aliphatic polyester that can be manufactured from both fossil and renewable resources. The average strength, low modulus and high impact strength make PBS an interesting matrix for stiff and brittle material reinforcement. These inherent properties of PBS make it suitable for green composite applications and its renewability offers a great future in composite industries. PBS is a tough biopolymer and capable of incorporating a higher volume fraction of biomass. The growing interest for PBS manufacturing predicts a cost reduction much lower than the current price. Natural fiber reinforced PBS composites have been reported [12-14]. PBS is generally blended with other compounds, such as starch and adipate copolymers, to reduce the cost of PBS use. As previously mentioned, as of the date of this document, no literature on lignin based PBS or PHBV blends can be found. Since PBS can be manufactured from renewable resources, in another aspect the present invention provides for a bioplastic material comprising lignin and PBS.

The inventors further discovered that the mechanical and thermo-mechanical properties of lignin/PBS plastic materials can be improved with the use of compatibilizers, such as PMDI. The effect of polymeric PMDI on the performance of bioplastic-natural filler composites was studied [18, 19]. Improvement of tensile strength, elongation has been reported by the researchers.

As such, in another aspect, the present invention provides for a plastic material comprising lignin, PBS and one or more compatibilizers. Compatibilizers that can be used in the present invention include PMDI, titanate and silane.

The inventors further discovered that the addition of hybridizing biofibers further contribute to the mechanical and thermo-mechanical properties of the lignin/PBS plastic materials of the present invention. The inventors discovered that the addition of switchgrass and *miscanthus* to the lignin/PBS blends can be effective for maintaining stiffness and toughness balance of the plastic blend. Thus, in another aspect, the present invention provides for a plastic material comprising lignin, PBS and at least one grass fiber. Grass fibers that can be used in the present invention include switchgrass and *miscanthus*. Other grass fibers that can be used in the present invention include hemp, jute, kenaf, and other suitable grass fibers.

Filler hybridization is an innovative technique to improve the material properties through a favorable balance between the inherent advantages and disadvantages of the individual component. Hybridization of fillers often resulted in the improved composite properties [20].

Switchgrass is a promising biomass feed stock for value added applications due to its low maturation period, high yield, positive environmental effect and low requirement for agricultural input. The environmental benefit associated with switchgrass includes underground carbon sequestration, soil remediation and nutrient recovery from run off. Value added applications of switchgrass include cellulosic bioethanol production, news print productions, for energy as coal co-firing (switchgrass pellets and coal together as fuel) and fiber reinforcement in thermoplastic composites. There are very limited studies on grass fibers reinforced thermoplastic composites, a few are reported particularly with polyolefins. Switchgrass reinforced polypropylene [15], low-density polyethylene [16] and linear low density polyethylene [17] composites are reported by researchers. Switchgrass based PBS or biopolymer composites are very rare in the literature.

The incorporation of biofillers to polymers results in a decrease on the impact strength of the composites (see for example Table 1 where neat PBS has a better impact strength than any other blended composite). Therefore, the inventors further studied the addition of other additives, including Krasol®NN22, ESO and Luperox® 101 (initiator) to formulate new bioplastic composites for various high strength and toughness applications. The addition of Krasol®NN22, ESO and Luperox® 101 resulted in plastic materials having improved impact strength while maintaining average strength and HDT values of the blend composites (see Table 3 and Table 4).

Another aspect of the present invention relates to a method of making melt extruded, injection molded, compression molded, thermoformed or injection-compression molded plastic composite products wherein the lignin (and/or at least one grass fibers) are melt blended and dispersed in the PBS and/or PBS:PHBV composite granulates or pellets during the molding process. Preferably, the method comprises melt extrusion, injection molding, or injection-compression molding of the in situ blend of lignin fibre PBS composite granulates or pellets.

Another aspect of the present invention relates to a method of making injection or compression, or injection-compression molded or thermoformed composite products from the granulates or pellets of the lignin/PBS blends of the present invention, or using the blends as is without forming any granulates or pellets as they come out in the forms of lumps from the extruder. Preferably, the method comprises injection molding of the pre-dried granulates or pellets by removing moisture by drying to below 5% by weight. In a process of injection-compression molding, a minimum pressure is required. This minimum injection pressure depends on the part size, mold design, gate opening and other mold design parameters. In accordance with the present invention, dispersion of the fibre in the polymer matrix can be further improved by increasing the injection pressure.

Figure 2:
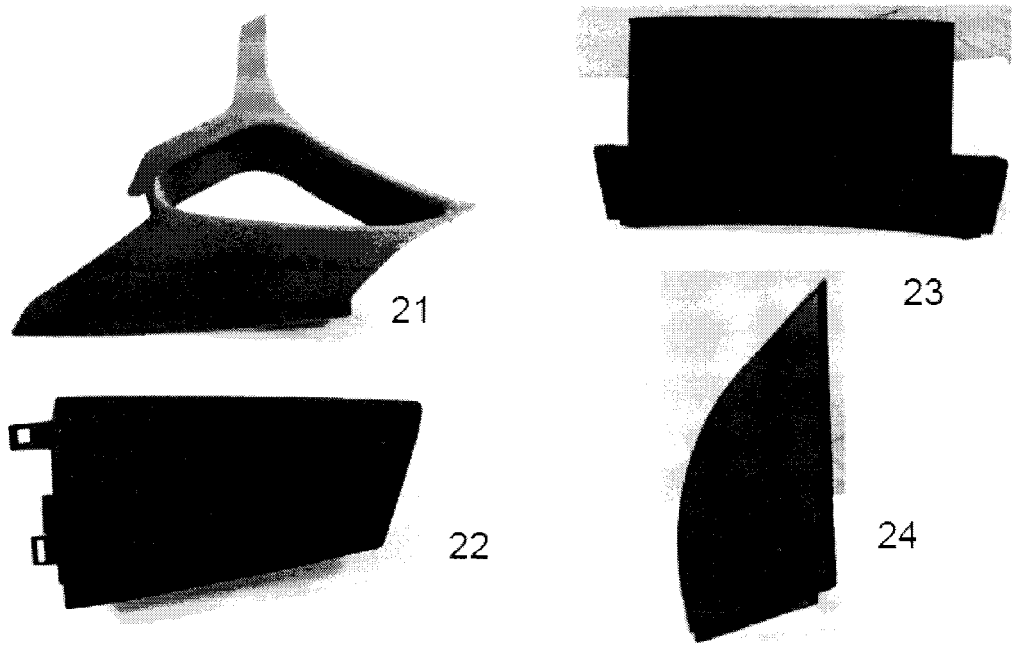
FIG. 2 illustrates prototypes of car parts manufactured from the bioplastic materials of the present invention.

In another aspect the present invention relates to molded articles or products obtained by molding of the lignin-based plastic blends of the present invention. Applications of the plastic materials of the present invention include: interior automotive parts (see FIG. 2) like car door panels 21, switch plates 22, console boxes 23, car seat separators (separating panel between car seats), door frame brackets 24; consumers products like trash cans; and packaging (rigid boxes), office supplies, building products and furniture.

EXAMPLES

The following examples illustrate some of the moldable, biodegradable, compostable and recyclable blends and composite products comprising lignin and PBS and the methods of making the same within the scope of the present invention. These are illustrative examples only and changes and modifications can be made with respect to the invention by one of ordinary skill in the art without departing from the scope of the invention.

The inventors studied the mechanical and thermo-mechanical properties of ligning-PBS blends. The effects of lignin content, effect of PMDI, Krasol®N22, epoxidized soy bean oil (ESO), Luperox® 101, and effect of filler hybridization on the mechanical and thermo mechanical properties of lignin/PBS blend composites were studied in two parts:

Part I: Studies the mechanical and thermo mechanical effects of engineered lignin content on lignin-PBS blend composites as well as the effect of adding PMDI and biofillers.

Part II: Incorporation of biofiller to the polymers reduces the impact strength of the composites. Engineering lignin also adds extra cost to the developed material. Part II of this invention focused on the use of industrially available raw lignin (without any engineering) and biofibers (locally grown switchgrass and *miscanthus* at present) to develop composites without sacrificing the material properties. Various material formulations are made for achieving better impact performance of the bioplastic materials.

Materials

Part I: Poly(butylene succinate) (PBS) pellets with a grade name Bionolle 1020 was supplied by Showa High Polymers, Japan. Lignin (Arboform F-45) in pellet form was supplied by Tecnaro GmbH, Germany. Poly(3-hydroxybutyrate-co-3-hydroxyvalerate), (PHBV) (Biopol D600GN) pellets with a grade 6L600N19 was supplied by Monsanto, UK. Polymeric methylene diphenyl diisocyanate (PMDI) with a trade name Rubinate® M was supplied from Huntsman Polyurathanes. Switchgrass fibers were supplied from Nott farms, Clinton, Ontario. Epoxidized soybean oil with a trade name Vikoflex™ 4050 (ESO) was procured from Arkema Inc.

Part II: Poly(butylene succinate) (PBS) pellets with a grade name Bionolle 1020 & Bionolle 1001 was supplied by Showa High Polymers, Japan. PLA with grade name Terramac TE 2000 was supplied by Unitika (Unitika Plastics Division), Japan. Lignin (Protobind 2400) in dry powder form was supplied by ALM Private Limited, India. Polymeric methylene diphenyl diisocyanate (PMDI) with a trade name Rubinate® M was supplied from Huntsman Polyurathanes. Switchgrass fibers were supplied from Nott farms, Clinton, Ontario. Miscanthus fibers were supplied by Pyramid farms, Ontario. ESO with a trade name Vikoflex® 4050 and 2,5-Bis(tert-butylperoxy)-2,5-dimethylhexane (tech., 90%) with a trade name Luperox® 101 was procured from Arkema Inc. USA. Methylene diphenyl diisocyanate (MDI) polybutadiene prepolymer (Krasol® NN 22) was procured from Sartomer, USA.

Experimental

Part I: Fibers (switchgrass) and Lignin pellets (Arboform F45) with various weight percentages individually or together (1:1 fiber:lignin ratio in PBS and PBS:PHBV blends), as well as with and without PMDI were melt extruded in a DSM micro extruder (made in Netherland) at a temperature 160° C., 150 rpm screw rotation and 6-10 min processing time. The molten blends were then collected from the extruder and molded in to test coupons using DSM microinjection molding with a barrel temperature 160° C. and mold temperature 30° C. Various specimens prepared are as follows: Neat PBS specimen (0% filler), 30%, 50%, and 65% lignin filled PBS composites, 50% lignin-PBS composites with 1% PMDI, 50% lignin-PBS composites with 2% PMDI, 50% switchgrass fiber-PBS composites, 50% lignin-50% hybrid polymer (1:1 PBS:PHBV) composites, 50% Hybrid filler (1:1 lignin:switchgrass)-PBS composites and 50% hybrid filler (1:1 lignin:switchgrass)-PBS composite with 1% PMDI. Only weight percentage of filler, matrix and compatibilizer was taken in the invention. Composites were prepared without changing the filler:polymer ratio (1:1) i.e. composition was maintained as 99% (50% polymer+50% filler) and 1% PMDI.

Lignin:switchgrass ratio was 1:1 in the hybrid filler. Composites with 70% lignin were prepared by adding 5% ESO to the lignin-polymer mixture keeping the total content 100% (i.e. 25% PBS+5% ESO+70% lignin).

Figure 3:
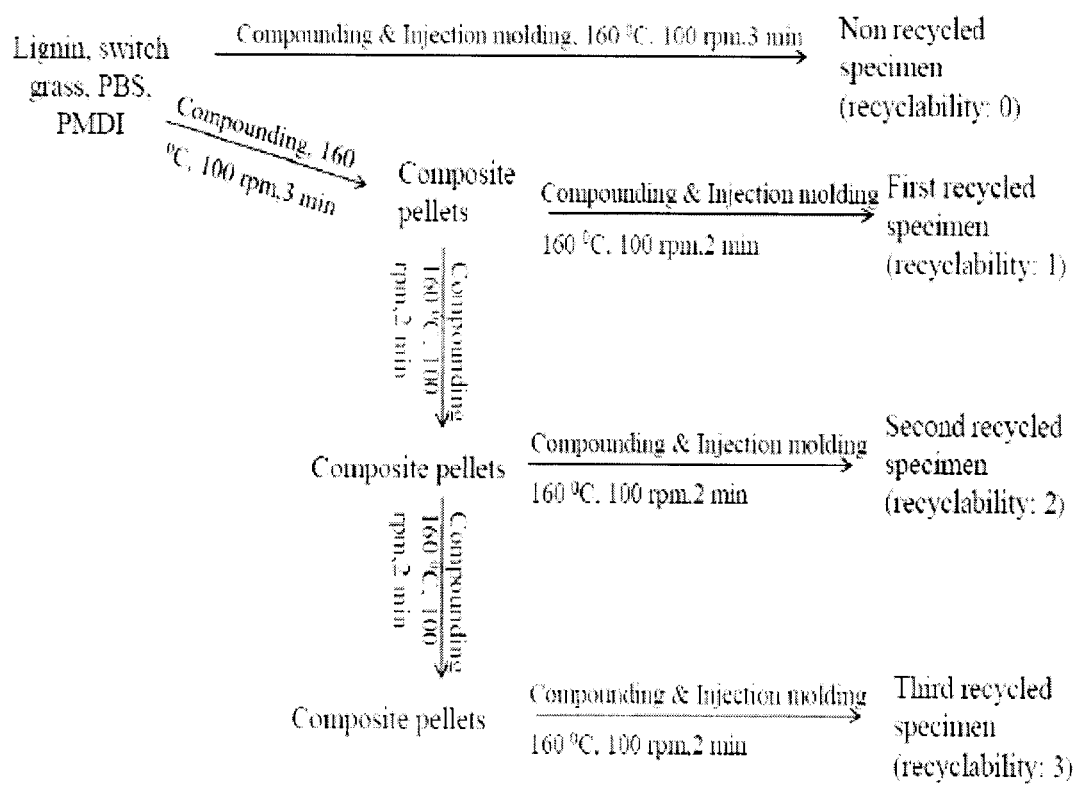
FIG. 3 illustrates a schematic representation of the processing of the bioplastics of the present invention for recyclability study.

Part II: Similar melt mixing (extrusion followed by injection molding) technique was used for composite fabrication. Lignin powder (Protobind 2400) and switchgrass (in a ratio of 1:4) was mixed to PBS (1:1 ratio of 1020 and 1001 grade) to make 50% filler loaded composites. This composition was considered as a base material for subsequent formulations. 1-7% of various additives (PMDI, Krasol®NN22, Luperox® 101) were added to the base material. Unlike part I processing, the screw rotation and cycle time were reduced to 100 rpm and 3 minute respectively to minimize the energy consumption while the processing temperature was same (160° C.) in part II processing. Miscanthus based formulation i.e. 94% [50% hybrid filler (lignin-*miscanthus* (1:4)–50% PBS (PBS 1020: PBS 1001, 1:1)]+1% PMDI+5% krasol was made at 160° C., 100 rpm and 3 minute processing condition. PLA based formulation was made at 170° C. 10% of PBS was substituted by PLA in the formulation. Specimens for recyclability study of the formulate composition (III) i.e. 99% [50% Hybrid filler (1:4 lignin:Switchgrass)+50% PBS (PBS 1020: PBS 1001, 1:1)]+1% PMDI was made as per the schematic representation of FIG. 3. Composite pellets were prepared at 160° C. using 100 rpm screw rotation used for 3 minutes for recyclability test. Composite pellets made were used to make specimen at 160° C., 100 rpm screw rotation for 2 minutes which was considered as first recycled specimens. Similarly, the composite pellets were made for second and third recycled specimens by subsequently compounding recycled pellets for 2 minutes at 160° C. using 100 rpm screw rotation. Specimens were also prepared at the same processing conditions i.e. 160° C., 100 rpm, for 2 minutes.

Characterization

PBS, PHBV, Lignin and biofiber bioplastic composites with various compositions in presence and absence of compatibilizers and other additives were molded into bars for impact, flexural and thermo-mechanical (storage modulus and heat deflection temperature (HDT)) studies. Dumb bell shaped specimens were made for tensile properties evaluation.

Thermo-mechanical Properties: Storage modulus and HDT measurements were done on a dynamic mechanical analyzer (Q800 DMA), (TA instruments) using three point bending clamp at a temperature range of –60° C. to 110° C. at a ramp rate of 3° C./min for storage modulus study and room temperature to 110° C. with a ramp rate of 2° C./min for HDT studies.

Mechanical Properties: Notched Impact properties, tensile and flexural properties of the composite specimens were measured according to ASTM standards using TMI Impact machine (with 5 ft-lb pendulum) and Instron Universal Testing respectively.

Example 1

Part I—Effects of Engineered Lignin Content & Effects of Additives and Biofillers on Lignin-PBS Blends Studies on engineered lignin-PBS blend composites have shown that lignin acts as reinforcer in the blended composites. All mechanical and thermodynamical properties studied increased simultaneously with increased lignin content in the blend. The simultaneous increase in the properties of the blends with increasing lignin content is a unique property of the blends of the present invention, which can be exploited to manipulate or control the properties of the blends to different applications. Neat PBS have better impact strength than any of the blends studied, however, within the impact strength study, increased lignin content results in decrease to the impact strength of the blend.

Use of PMDI compatibilizer improves the mechanical properties significantly. Hybridization of biofillers (switchgrass, lignin and/or *miscanthus* (not shown in Part I) further improves the stiffness of lignin-PBS blends. Lignin in PBS: PHBV blend also improves modulus as well as thermo-mechanical properties. Surface treatment of lignin with titanate coupling agent is expected to improve the properties of composites. Research using surface treatments, coupling agent treatments, use of various other polymers and fibers like *miscanthus*, hemp, flax etc. are under progress. Use of epoxidized soy bean oil (ESO) facilitates easy processability and allows more filler incorporation to the polymer. ESO also improves impact strength of the composites. About 70% lignin incorporation has been achieved successfully.

1. Dynamic Mechanical Analysis (Storage Modulus of Composites)

Storage modulus of composites are shown in Table I. Storage modulus of composites increased on increasing lignin content from 0-70% in PBS matrix. High filler (65 & 70%) incorporation with improvement of properties is the significant achievement of this research. At 50% and 65% lignin content, storage modulus of composites increased by 340% and 640% respectively. Storage modulus of composites at 70% lignin content remained almost same as 65% because of the small filler variation of about 5% and the presence of ESO that plasticizes the material. Hence, it is assumed that the plasticization by ESO and improvement due to 5% lignin addition might have equal and opposing effect that resulted in no further change in the modulus at 70% lignin filled composites. ESO was added as a processing aid/viscosity modifier to facilitate easy processing of highly filled (70%) composites. PMDI compatibilizer has very little effect on the storage modulus of 50% lignin-PBS composites. It is observed that there is almost no change of modulus when 1% PMDI is added to 50% lignin-PBS composites however, modulus changes from 2.34 to 1.82 GPa on increasing PMDI to 2%. Table I shows the effect of switchgrass, lignin-switchgrass hybrid filler, effect of polymer hybrid and effect of PMDI on the hybrid filler composites. Switchgrass fiber filled PBS composites showed better storage modulus (about 580% higher than base polymer and about 56% higher than the composites filled with same percentage of lignin). Blending polymer (1:1) PBS:PHBV in 50% lignin filled polymer composites or hybridizing filler (1:1 lignin:switchgrass) in 50% filler filled PBS composites improves the storage modulus as compared to same percentage of lignin filled PBS composites (Table 1). Addition of 1% PMDI to the hybrid filler composites further improves the storage modulus compared to hybrid filler composites without PMDI. Besides, it is observed that addition of lignin reduces the viscosity of the melt which could be helpful to add more fiber in to the composite system.

2. Heat Deflection Temperature (HDT) of Composites

Heat deflection temperature (HDT) is an essential property required for the design and wide range of applications of a material. It is a measure of the dimensional stability of the material under a particular load and temperature. In other words, HDT is upper limit of the temperature up to which the material has the ability to retain its stiffness up under a specific load and above which it suffers a rapid dimensional change. High HDT value is most desirable for the materials used in high temperature applications. HDT values of neat PBS and all composites are shown in Table 1. HDT of neat PBS was around 78° C. HDT of composites increased with increasing lignin content up to 50% and reduced by 1° C. on further increasing lignin content up to 65%. HDT of the 70% lignin filled composites is about 5° C. lower than 65% lignin filled composited. Presence of ESO and higher filler:polymer ratio might have acted together in reducing the HDT in 70% lignin filled composites. Compatibilizer further enhanced HDT of lignin composites possibly due to the improved adhesion between filler and polymer through the coupling mechanism. Switchgrass filled composites showed highest HDT which is comparable to polypropylenes. HDT usually increases with the incorporation of fillers [27]. HDT of hybrid (lignin-switchgrass) composites approached close to 100° C. and was intermediate between individual filler reinforced composites. 1% compatibilizer (PMDI) further enhanced HDT of hybrid composites to 102° C. which is still close to polypropylene. It is believed that, reduction in the free volume in the composite system (due to compatibilization) improves the dimensional stability and hence the HDT of composites.

TABLE 1

Mechanical and Thermodynamical Properties of Composites

| Neat Polymer/Composite Formulations | Impact Strength (J/M) | HDT (degrees Celsius) | Storage Modulus (GPa) |
|---|---|---|---|
| PBS | 40 ± 8.4 | 77.7 | 0.62 |
| 30% Lignin – 70% PBS | 29 ± 1.0 | 82.7 | 1.22 |
| 50% Lignin – 50% PBS | 15 ± 0.9 | 86.3 | 2.26 |
| 65% Lignin – 35% PBS | 11 ± 0.9 | 85.3 | 3.7 |
| 70% Lignin – 25% PBS + 5% ESO | 11 ± 1.9 | 79.8 | 3.8 |
| 99% (50% lignin – 50% PBS) + 1% PMDI | 29 ± 2.3 | 89.8 | 2.34 |
| 99% (50% lignin – 50% PBS) + 2% PMDI | 25 ± 3.7 | 93.7 | 1.82 |
| 50% lignin – 50% hybrid polymer (PBS:PHBV, 1:1) | 12 ± 2.9 | 87.9 | 2.87 |
| 50% Switchgrass – 50% PBS | 25 ± 2.1 | 106.4 | 3.58 |
| 50% hybrid filler (lignin:switchgrass, 1:1) – 50% PBS | 24 ± 3.7 | 98.3 | 2.62 |
| 99%[(50% hybrid filler (lignin:switchgrass 1:1) – 50% PBS)] + 1% PMDI | 29 ± 3.1 | 102.3 | 3.09 |

3. Tensile Strength of Composites

Tensile strength of composites is shown in Table 2. Tensile strength of composite first decreased on increasing lignin content up to 50%. Increasing lignin content to 65% lignin, tensile strength of composites increased as compared to neat PBS polymer. Tensile strength of composites decreased on further increasing lignin content to 70%. The decrease in the tensile strength at 70% lignin content may be due to the combined effect of ESO content and high volume fraction of filler (only 25% polymer), however, the value (28.7 MPa) is still significant compared to some conventional plastics. The aim of 70% filler incorporation is to reduce the material cost while having significant material properties required for specific applications. Compatibilization of 50% lignin-PBS composites with very low percentage (1-2%) of PMDI improved the tensile strength by nearly 27-44% over the corresponding composites without compatibilizer. PHBV and PBS blending with lignin is not effective in improving tensile strength of 50% lignin filled composites however, blending of few other polymers are under the scope of our present research. Although PBS-PHBV blend based lignin composite did not show any improvement in the tensile strength, other properties like modulus and thermo-mechanical properties improved as compared to a single matrix (50% lignin-PBS) system. 50% switchgrass filled PBS composite and 50% hybrid filler (1:1 lignin:switchgrass) filled PBS composite show improvement of tensile strength as compared 50% lignin-PBS composites. Addition of 1% PMDI to the 50% hybrid filler (1:1 lignin:switchgrass) based composites improved the tensile strength by 24 and 28% respectively over the base polymer and uncompatibilized hybrid filler (lignin-switchgrass) composites. Hybridization of various fibers (such as switchgrass, miscanthus, flax/hemp etc.) and lignin, blend of various polymers as well as addition of compatibilizers with selective functionality (like titanate, PMDI, silanes etc) are under the scope of our future research.

4. Young's (Tensile) Modulus of Composite

Young's moduli of composites are shown in Table 2. Young's modulus of composites increased on increasing lignin content from 30% to 70%. Addition of PMDI to 50% lignin-PBS composites slightly decreased modulus of composite however the effect is quite insignificant on increasing the PMDI content from 1 to 2%. Modulus of switchgrass fiber-PBS composite is comparatively higher than other composites. Modulus of hybrid polymer composites, hybrid filler composites and the use of compatibilized hybrid filler composites are almost same.

5. Flexural Strength of Composites

Flexural strength of composites is shown in Table 2. Flexural strength of composites increased gradually (about 40 to 84%) on increasing lignin content from 30% to 65% then decreased at 70% lignin filled composites. Addition of PMDI to lignin-PBS composites increased the flexural strength significantly. More improvement is observed in 1% PMDI added composites accounting 48% increment over uncompatibilized material (50% lignin-PBS) and by 140% over neat polymer. Flexural strength of 50 wt % switchgrass filled composites is nearly same as 50% lignin filled composites. Polymer hybrid decreased the flexural strength of composites. Fiber-lignin hybridization had a synergistic effect on the flexural strength of hybrid composites that enhanced the strength to more than 80% compared to neat polymer and about 12-13% higher compared to individual filler reinforced PBS composites. Compatibilizer improved the flexural strength dramatically in lignin-switchgrass hybrid composites resulting highest flexural strength (75.2 MPa) which accounts 46% improvement over uncompatibilized hybrid material and about 165% over neat polymer. Greater stress transfer from matrix to fiber through a compatibilizer modified strong interface might have been the cause of the significant improvement of composites.

6. Flexural Modulus of Composites

Flexural modulus of lignin reinforced PBS composites are shown in Table 2. Flexural modulus of composites increased significantly on increasing lignin content. Increment in the flexural modulus up to 500% was achieved on increasing lignin content to 65% and then decreased slightly at 70% lignin content (due to presence of lesser polymer and ESO content in the composition). The effect of fiber reinforcement, polymer blending, filler (lignin-fiber) hybridization and effect of compatibilizer on the performance of composites were studied. Flexural modulus of composites with 1% compatibilizer almost remained the same (or slightly changed) as that of uncompatibilized materials of similar composition. Flexural modulus of composites decreased by 0.2 GPa on increasing PMDI content to 2% PMDI content. Flexural modulus of 50 wt % switchgrass filled composites was 3.64 GPa which is much higher than 50% lignin filled composites (2.2 GPa) accounting 478% increment over neat polymer while modulus for 50% lignin filled composites was 249% higher than neat polymer. Polymer blending (1:1 PBS:PHBV) with lignin (50%) had significant improvement over only PBS based composites at same filler incorporation (50% lignin). Modulus (lignin-switchgrass) hybrid filler composites reflected a rule of mixture and the value was in between the two individual filler reinforced composites. Flexural modulus of composites with 1% compatibilizer almost remained the same as that of uncompatibilized materials of similar composition i.e PMDI increases strength without much affecting the modulus of composites. Greater stress transfer from matrix to fiber through a compatibilizer modified strong interface might have been the cause of the significant improvement of composites.

TABLE 2

Mechanical Properties of Composites

| Neat Polymer/Composite Formulations | Tensile Strength (MPa) | Tensile Modulus (GPa) | Flexural Strength (MPa) | Flexural Modulus (GPa) |
|---|---|---|---|---|
| PBS (1020) | 35 ± 1.5 | 0.6 ± 0.01 | 28 ± 0.42 | 0.6 ± 0.01 |
| 30% Lignin – PBS | 26 ± 1.8 | 1.1 ± 0.03 | 40 ± 0.54 | 1.1 ± 0.01 |
| 50% Lignin – PBS | 29 ± 3.4 | 2.3 ± 0.35 | 46 ± 0.3 | 2.2 ± 0.03 |
| 65% Lignin – PBS | 39 ± 1.1 | 3.3 ± 0.04 | 52 ± 1.1 | 3.8 ± 0.15 |
| 70% Lignin – 25% PBS + 5% ESO | 29 ± 0.4 | 3.4 ± 0.14 | 39.5 ± 1.7 | 3.6 ± 0.08 |
| 99% (50% lignin – PBS) + 1% PMDI | 37 ± 6.1 | 2.0 ± 0.03 | 68 ± 1.8 | 2.3 ± 0.07 |
| 99% (50% lignin – PBS) + 2% PMDI | 42 ± 4.7 | 1.9 ± 0.19 | 66 ± 0.6 | 2.1 ± 0.03 |
| 50% lignin-hybrid polymer (PBS:PHBV 1:1) | 28 ± 1.3 | 2.6 ± 0.05 | 35 ± 2.8 | 3.4 ± 0.08 |
| 50% Switchgrass – PBS | 34 ± 0.2 | 3.1 ± 0.04 | 46 ± 0.6 | 3.6 ± 0.11 |
| 50% hybrid filler (lignin:switchgrass, 1:1) – PBS | 33 ± 3.0 | 2.5 ± 0.04 | 51.5 ± 1.3 | 3.0 ± 0.09 |
| 99%(50% hybrid filler (lignin:switchgrass 1:1) – PBS) + 1% PMDI | 43 ± 1.6 | 2.5 ± 0.14 | 75 ± 1.9 | 3.0 ± 0.07 |

7. Impact Strength of Composites

Impact strength of composites is shown in Table 1. As shown in Table 1, impact strength of composite decreased with lignin incorporation up to 65% then increased at 70% lignin content. The increase in the impact strength at 70% lignin content can be probably due the presence of ESO which acts as a plasticizer for polymer/polymer composites. It is observed from literature that incorporation of biofillers drastically reduce the impact strength of composites as compared to the neat polymers. Comparing 50% lignin-PBS composites with and without compatibilization, it is observed that impact strength of composites increased with PMDI addition compared to composites without PMDI. Impact strength of composites (50% lignin content) at 1% PMDI content is 92% higher than the uncompatibilized composites with same polymer filler ratio while the increment decreased to 70% on increasing PMDI content to 2%. Impact strength of composite measures the ability of the material to resist the fracture failure under a stress applied at a high speed. Fibers plays key role towards the impact resistance or toughness of a material as they act as a medium for stress transfer as well as energy absorber. In the current research, impact strength of composites decreased drastically with the filler incorporation. Lignin pellets mostly contain amorphous lignin and a little biofiber in powder form. Negligible fiber content and small size of fiber had no contribution for energy absorption during fiber pullout process. Switchgrass-PBS composites showed more than 68% higher impact strength compared to lignin-PBS composites at 50 wt % filler content that might have caused due to the comparatively bigger fiber size and cellulose content of fiber. Impact strength value of lignin-switchgrass hybrid composites was in between two individual filler (switchgrass & lignin separately) based composites. Polymer hybridization (PBS & PHBV) at 50% lignin filled composites has decreased the impact strength because of the brittle character of PHBV. Addition of 1% PMDI compatibilizer to lignin-switchgrass hybrid filler (50 wt %) based PBS composites improved the impact strength by nearly 23% compared to hybrid composites without compatibilizer. Impact strength depends upon many factors such as types of fiber, fiber aspect ratio, interface chemistry etc. Poor interface of the biomass filled thermoplastic composites, reduction of fiber size during composite processing often deteriorate the impact performance of composites. PMDI improved the interface through the chemical interlinking between lignin/switchgrass and PBS that resulted in the increase in the impact strength of composites.

Example 2

Part II—Effects of Raw Lignin, Biofibers and Additives in Lignin/PBS Blends

Part II discusses the effect of Krasol®NN22, ESO, and Luperox 101™ on the properties of composites. From the previous study it is observed that, addition of 1% PMDI provides significant improvement in the properties while lignin-switchgrass hybridization is effective in maintaining a stiffness and toughness balance. So, objective of part II research was to use PBS, lignin, switchgrass and PMDI for developing a material for further addition of additives like Krasol®NN22, ESO and Luperox® 101 (initiator) to formulate new materials for various high strength and toughness applications. 50% hybrid filler (Lignin: Switchgrass, 1:4)-50% PBS (1:1 ratio of PBS1020 & 1001 grade) was considered as base material for addition of other additives (1% PMDI, 5-7% Krasol®NN22, 3% ESO and 1% peroxide). Two grades of PBS are taken in the formulations and the properties of composites are compared with neat PBS 1020 and with the developed base material. Formulations are well mentioned in the table. Filler:polymer:additive ratio in formulation IX is same as formulation VIII only a fraction of PBS was substituted by PLA. Instead of 50% PBS (1:1 ratio from both the grades) 40% PBS (1:1 ratio) and 10% PLA was taken in the formulation. The objective was to improve the impact strength while maintaining average strength and HDT values of the composites. Formulation IV and formulation X are identical except that in formulation X switchgrass was replaced with *miscanthus*.

2.1. Heat Deflection Temperature (HDT) of Composites

HDT values of all composites made from PBS, lignin (protobind 2400) and switchgrass at a ratio of 1:4 are shown in Table 3. HDT of neat PBS was around 78° C. HDT of composites with 50% filler (lignin: switchgrass, 1:4) based PBS (1020 &1001 grade 1:1 ratio) composites (base material) increased to 106.1° C. Addition of 1% PMDI to base material increased HDT to 108.8° C. Addition of Krasol®NN22 (5%) and 1% PMDI to the base material decreased HDT compared to the base material however a little improvement was observed when 1% Luperox® 101 was added to the said composition. Addition of ESO and krasol to compatibilized (1% PMDI added) base material further decrease HDT but the values are still 20° C. or more higher than neat PBS i.e. around 100° C. which is again about 45° C. or higher than the known bioplastics, PLA. Substitution of a small fraction (~10%) of PBS by PLA (formulation IX) has very negligible effect on HDT compared to similar formulation without having PLA in it (formulation VIII). Miscanthus and lignin based formulation (formulation X) showed about 4° C. higher HDT than the corresponding formulation with switchgrass and lignin (formulation IV).

2.2. Tensile Strength of Composites

Tensile strength of composites is shown in Table 4. Tensile strength of base material is lower than the neat PBS. However, addition of 1% PMDI to the base material increased the tensile strength to a value almost same as neat PBS. Adding Krasol®NN22 to the compatibilized (1% PMDI added) base material decreased tensile strength to nearly 30 MPa. Addition of Luperox® 101 in addition to 5% Krasol®NN22 and 1% PMDI to the base material improved the tensile strength significantly by more than 25% over the similar formulations without Luperox® 101 and about 34% higher than base material. The tensile strength of composites with Luperox® 101 (37.6 MPa) is even higher than neat PBS. Addition of 3% ESO and 1% PMDI to the base material does not change the tensile strength value however, the tensile strength decreased by the addition of 5% and 7% krasol in addition to ESO and PMDI. The lowest tensile strength obtained in the formulations is even compared with some conventional polymers and can find various applications where high strength is not desirable. Substitution of a small fraction (~10%) of PBS by PLA (formulation IX) improved the tensile strength of composites by a factor of 2 compared to similar formulation without having PLA in it (formulation VIII). Higher tensile strength (38.5 MPa) was observed in the *miscanthus* and lignin based composite (Formulation X), which is about 8.5 MPa higher than the corresponding composite with switchgrass and lignin reinforcement (Formulation IV). Miscanthus fiber showed better reinforcing effect compared to switchgrass.

2.3. Young's Modulus of Composite

Young's modulus of composites is shown in Table 4. Young's moduli of all the composites are significantly higher that the neat PBS. Addition of PMDI increased modulus while addition of Krasol®NN22 slightly decreased the modulus compared to the corresponding composition with no Krasol®NN22. Modulus of composites almost remained unaltered by the addition of Luperox® 101. Addition of 3% ESO and 1% PMDI to base material decreased the modulus by 0.3 GPa compared to 1% PMDI added composites (2.6 GPa), the value is still higher than the base material. Addition of Krasol®NN22 (5% and 7%) together with 3% ESO and 1% PMDI to the base material resulted in decrease of young's modulus of composites compared to the base material. The lowest modulus obtained in the developed composite formulations is even higher than some conventional polymers. Substitution of PBS by PLA (formulation IX) improved the young's modulus of composites by a factor of 0.5 GPa over similar formulation without having PLA in it (formulation VIII). Higher tensile modulus was observed in the *miscanthus* and lignin based composite (Formulation X) compared to similar composition with switchgrass and lignin (formulation IV).

2.4. Flexural Strength of Composites

Flexural strength of composites is shown in Table 4. Flexural strength of all composites is significantly higher than the neat PBS. The flexural strength of base material (46.8 MPa) is about 65% higher than the neat PBS. By the addition of 1% PMDI compatibilizer, flexural strength of composites increased by 35% over the base material which is about 123% higher than the neat PBS. Addition of 5% Krasol®NN22 to compatibilized base material decreased the flexural strength to 55.1 MPa which is also 17% higher than base material. Addition of only 1% Luperox® 101 to the formulation having 1% PMDI and 5% Krasol®NN22 further increased the flexural strength of composites to 63.5 MPa. Addition of 3% ESO and 1% PMDI to the base material decreased the flexural strength compared to the compatibilized (1% PMDI added) base material and the value was again 17% higher than the base material. Addition of Krasol®NN22 (5%, 7%) to the composite formulations having 3% ESO and 1% PMDI further decreased the flexural strength to values which are nearly same as base material. Substitution of a small fraction (~10%) of PBS by PLA (formulation IX) improved the flexural strength of composites by 3 MPa compared to similar formulation without having PLA in it (formulation VIII). Flexural strength of *miscanthus* and lignin based composite (Formulation X) was also higher than the corresponding composite with switchgrass and lignin reinforcement (Formulation IV). The flexural strength of Formulation X (flexural strength of 66 MPa) was also found to be the highest flexural strength among all the formulations of Part II studies.

2.5 Flexural Modulus of Composites

Flexural modulus of composites is shown in Table 4. Flexural moduli of lignin-switchgrass reinforced composites are significantly higher than the neat PBS. Flexural modulus of base material is about 420% higher than the neat polymer. Addition of 1% PMDI to base material had no effect on the flexural modulus of composites however; addition of 5% Krasol®NN22 and 1% PMDI together to the base material decreased the flexural modulus by a factor of 0.6 GPa compared to base material. Addition of Luperox® 101 had almost no effect on the modulus of composites compared to the corresponding composition without Luperox® 101. Addition of ESO and Krasol®NN22 (5% & 7%) separately and together decreased the flexural modulus by about 0.4 GPa, 0.9 GPa and 1.0 GPa respectively. Substitution of a small fraction (~10%) of PBS by PLA (formulation IX) slightly improved the flexural modulus compared to similar formulation without having PLA in it (formulation VIII). Flexural modulus of *miscanthus* and lignin based composite (Formulation X) was about 0.7 GPa higher than the corresponding composite with switchgrass and lignin reinforcement (Formulation IV).

2.6. Impact Strength of Composites

It is observed from literature that incorporation of biofillers drastically reduce the impact strength of composites as compared to the neat polymers. However, current research depicts a great achievement on improving the impact strength of the composites (at comparatively higher filler content ~50%) that is either comparable or higher than the neat PBS. Impact strength of composites is shown in Table III. Formulated base material showed about 9 J/M lower impact strength compared to the neat PBS. Addition of 1% PMDI to the base material slightly improved the impact strength by nearly one unit. Addition of 5% Krasol along with 1% PMDI to the base material increased the impact strength of composite which is almost similar to the neat PBS and about 28% higher than base material. Addition of 1% Luperox® 101 to above mentioned 5% Krasol and 1% PMDI added formulation slightly (by ~2 J/M) reduced the impact strength of composites compared to the corresponding formulation without peroxide which is still comparable with the neat PBS. Incorporation of 1% PMDI and 3% ESO to the base material slightly increased the impact strength over the compatibilized base material (1% PMDI added base material). Incorporation of 5% and 7% Krasol separately in addition to 3% ESO and 1% PMDI in the base formulation showed significant improvement in the impact strength of composites which is nearly 13% and 5% higher than the neat PBS and about 46% and 36% higher than the base material respectively. Substitution of a small fraction (~10%) of PBS by PLA (formulation IX) reduced the impact strength of composites by nearly 10 J/M compared to similar formulation without having PLA in it (formulation VIII). Highest impact strength 58 J/M was observed in the *miscanthus* and lignin based composite (Formulation X) which is about 19 J/M higher than the corresponding composite with switchgrass and lignin reinforcement

TABLE 3

Effect of Additives on the Impact Strength and HDT of Composites

| Formulations | Neat Polymer/Composite Formulations | Impact Strength (J/M) | HDT (degress Celsius) |
|---|---|---|---|
| I | PBS (1020) | 40 ± 8.4 | 77.8 |
| II | 50% Hybrid filler (lignin:Switchgrass, 1:4) + 50% PBS (PBS 1020:PBS 1001, 1:1) = Base material | 31 ± 1.4 | 106.1 |
| III | 99% Base material + 1% PMDI | 32 ± 1.5 | 108.8 |
| IV | 94% Base material + 1% PMDI + 5% Krasol ® NN22 | 39 ± 1.0 | 101.8 |
| V | 93% Base material + 1% PMDI + 5% Krasol ® NN22 + 1% Luperox ® 101 | 37 ± 2.8 | 102.7 |
| VI | 96% Base material + 1% PMDI + 3% ESO | 34 ± 0.8 | 105.4 |
| VII | 91% Base material + 1% PMDI + 3% ESO + 5% krasol | 42 ± 1.5 | 100.8 |
| VIII | 89% Base material + 1% PMDI + 3% ESO + 7% krasol | 45 ± 2.6 | 96.9 |
| IX | 89% [50% hybrid filler(lignin – switchgrass(1:4) + 50% Polymer (PBS 1020:PBS 1001:PLA, 2:2:1)] + 1% PMDI + 3% ESO + 7% Krasol ® NN22 | 35 ± 2.6 | 96.2 |
| X | 94% [50% hybrid filler(lignin – miscanthus(1:4) – 50% PBS (PBS 1020:PBS 1001, 1:1)] + 1% PMDI + 5% Krasol ® NN22 | 58 ± 3.3 | 106.1 |

Base material: 50% Hybrid filler (lignin:Switchgrass, 1:4) + 50% PBS (PBS 1020:PBS 1001, 1:1) (Formulation II), compatibilized base material: Base Material + 1% PMDI (formulation III).

TABLE 4

Effect of Additives on the Mechanical Properties of Composites

| Formulations | Neat Polymer/Composite Formulations | Tensile Strength (MPa) | Tensile Modulus (GPa) | Flexural Strength (MPa) | Flexural Modulus (GPa) |
|---|---|---|---|---|---|
| I | PBS (1020) | 35 ± 1.5 | 0.6 ± 0.01 | 28 ± 0.4 | 0.6 ± 0.01 |
| II | 50% Hybrid filler (lignin:Switchgrass, 1:4) + 50% PBS (PBS 1020:PBS 1001, 1:1)* | 28 ± 1.0 | 2.1 ± 0.15 | 47 ± 0.8 | 2.7 ± 0.11 |
| III | 99% Base material + 1% PMDI | 35 ± 2.6 | 2.6 ± 0.05 | 63 ± 0.1 | 2.7 ± 0.1 |
| IV | 94% Base material + 1% PMDI + 5% krasol | 30 ± 0.6 | 2.1 ± 0.13 | 55 ± 1.9 | 2.1 ± 0.03 |
| V | 93% Base material + 1% PMDI + 5% Krasol® NN22 + 1% Luperox® 101 | 38 ± 0.7 | 2.2 ± 0.07 | 63 ± 1.6 | 2.1 ± 0.04 |
| VI | 96% Base material + 1% PMDI + 3% ESO | 35 ± 0.9 | 2.3 ± 0.01 | 57 ± 0.1 | 2.3 ± 0.06 |
| VII | 91% Base material + 1% PMDI + 3% ESO + 5% Krasol® NN22 | 26 ± 0.3 | 1.8 ± 0.01 | 46 ± 1.7 | 1.8 ± 0.17 |
| VIII | 89% Base material + 1% PMDI + 3% ESO + 7% Krasol® NN22 | 26 ± 0.9 | 1.6 ± 0.08 | 45 ± 0.8 | 1.7 ± 0.54 |
| IX | 89%[50% hybrid filler(lignin – switchgrass(1:4) + 50% Polymer (PBS 1020:PBS 1001:PLA, 2:2:1)] + 1% PMDI + 3% ESO + 7% Krasol® NN22 | 28 ± 0.8 | 2.1 ± 0.09 | 48 ± 0.5 | 2.1 ± 0.06 |
| X | 94% [50% hybrid filler (lignin – miscanthus (1:4) – 50% PBS (PBS 1020:PBS 1001, 1:1)] + 1% PMDI + 5% Krasol® NN22 | 38.5 ± 1.3 | 2.6 ± 0.08 | 66 ± 3.0 | 2.8 ± 0.07 |

*: Base material: 50% Hybrid filler (lignin:Switchgrass, 1:4) + 50% PBS (PBS 1020:PBS 1001, 1:1)(formulation II), Compatibilized base material: Base Material + 1% PMDI (formulation III).

Overall Conclusions

This is a unique invention compared to the reported literature that resulted in significant improvement in the properties of the highly filled (65-70%) lignin/PBS blends without any additional compatibilizer.

70% lignin incorporation with significantly higher modulus and desirable (for some applications) tensile and flexural properties has been achieved.

Lignin as well as biofibers have been shown to improve the modulus and flexural strength of PBS based composites.

Matching of solubility parameter of lignin and PBS can be the key cause behind the significant improvement of lignin-PBS composites even at high lignin incorporation PMDI is a novel compatibilizer in lignin-PBS composites that can increase tensile, flexural as well as impact strength simultaneously at a very low concentrations (about 1%) without affecting the modulus of composites.

Hybrid filler/polymer based composite is promising to maintain stiffness and toughness balance but the extra advantage of using lignin in the hybrid filler is its adhesive nature that promotes interfacial adhesion between polymer and fiber and that results in the improvement of properties. The presence of large number of reactive functionalities like aromatic and aliphatic hydroxy groups, aliphatic and aromatic ether groups, benzene rings etc. in the huge complex molecular structure of lignin cause various entanglements with polymer and other fillers when used in the composites. Lignin also present in natural fibers but it acts as a binder of cellulose and hemicellulose through these reactive functionalities hence these functionalities are not available for further entanglement when used in the composites. Hence isolated lignin with biofiber makes a suitable hybrid filler for the reinforcement in the composites particularly when polar polymers like polyesters are considered.

Hybridization is a concept of improving material properties. Blending of polymers as well as hybridization of fillers (lignin and fibers) improve the properties of composites.

Comparing the properties of composites, in the current invention, more focus has been given to filler hybridization. Addition of only 1% PMDI to lignin-switchgrass hybrid filler based composite improves the properties of composites quite significantly (flexural strength of 75 MPa vs. neat PBS 28 MPa).

Impact strength is a very important property to decide the material for specific applications. Mostly the biopolymers show inferior impact strength, which again reduce drastically with biofiller incorporation. The current invention also focused at the improvement of the impact performance of biofiller based biodegradable polymer composite. Further, improvement of impact property results in the reduction of tensile and other properties. In the current invention, the impact strength of biopolymer/biofiller (lignin-switchgrass individually or together) based composites has been improved by PMDI addition i.e. 1% PMDI improved tensile, flexural and impact strength simultaneously with a very negligible effect on the modulus of composites.

Tremendous improvement in the impact properties of lignin-switchgrass based PBS composites have been achieved by the incorporation of PMDI, Krasol®NN22, ESO and Luperox® 101 with various combinations. Impact strength of around 15 J/M (50% lignin (arboform F45)-PBS has been improved to 45 J/M [89% {(50% (lignin protobind 2400: switchgrass 1:4)-50% PBS (1:1 ratio of 1020 and 1001 grade) with 1% PMDI, 3% ESO and 7% Krasol®NN22] by the addition of Krasol®NN22, epoxidized soy bean oil and 1% PMDI.

Tremendous improvement in the impact properties of lignin/PBS based composite has been achieved with the incorporation of *miscanthus* in replacement of switchgrass. Highest impact strength (58 J/M) was achieved by the lignin: *miscanthus* fiber based hybrid composites.

Formulations

A number of formulations are reported in part I & part II of this invention which could be used in many applications in the high strength/stiffness and/or high impact requirements.

a. Formulation from Part I with overall good properties combination: 99% (50% Switchgrass fiber:Lignin (1:1)-50% PBS) with 1% PMDI (Flexural strength 75.2 MPa, Tensile strength 42.9 MPa, Modulus ~2.5-3.0 GPa, impact Strength: 29.1 J/M, HDT 102.3° C.).

b. Formulations from Part II:

i. Best Formulation:

Formulation X: 94% [50% hybrid filler (lignin-*miscanthus* (1:4)-50% PBS (PBS 1020: PBS 1001, 1:1)]+1% PMDI+5% Krasol®NN22 (Tensile strength 38.5 MPa, Flexural strength 66 MPa, Modulus ~2.6-2.8 GPa, Impact strength; 58 J/M, HDT 106.1° C.).

ii. Formulations with Overall Good Properties Combination:

Formulation V: 93% [(50% (Lignin-Switchgrass (1:4)-50% PBS (1:1 film and injection grade)]+1% PMDI+5% Krasol®NN22+1% Luperox® 101 101 (Tensile strength 37.6 MPa, Flexural strength 63.5 MPa, Modulus ~2.15 GPa, Impact strength; 37 J/M, HDT 102.7° C.).

iii. Formulations for Applications with Average Properties Requirement:

Formulation 99% [(50% (Lignin-Switchgrass (1:4)-50% PBS (1:1 film and injection grade)]+1% PMDI (Flexural strength 63 MPa, and Tensile strength 35 MPa, and Modulus ~2.6-2.7 GPa, average Impact strength >31 J/M, HDT 108.8° C.).

Formulation IV: 94% [(50% (Lignin-Switchgrass (1:4)-50% PBS (1:1 film and injection grade)]+1% PMDI+5% Krasol®NN22.

Formulation VI: 96% [(50% (Lignin-Switchgrass (1:4)-50% PBS (1:1 film and injection grade)]+1% PMDI+3% ESO.

(Tensile strength; ~30-35 MPa, Flexural Strength ~55 MPa, Modulus ~2.3 GPa, Impact strength; 33-39 J/M, HDT 101-105° C.).

vi. Formulations for High Impact Requirements:

Formulation VII: 91% [(50% (Lignin-Switchgrass (1:4)-50% PBS (1:1 film and injection grade)]+1% PMDI+5% Krasol+3% ESO.

Formulation VIII: 89% [(50% (Lignin-Switchgrass (1:4)-50% PBS (1:1 film and injection grade)]+1% PMDI+7% Krasol®NN22+3% ESO (Tensile strength: ~26 MPa, Flexural Strength: 45-46 MPa, Modulus ~1.6-1.8 GPa, Impact strength: ~42-45 J/M, HDT: 100-102° C.).

Example 3

Recyclability of Formulated Composite Materials

The formulated composite materials are recyclable in nature. Composite formulation III of Part II of this invention i.e. 99% (10% Lignin-40% Switchgrass-25% PBS 1020-25% PBS 1001)+1% PMDI, was used for recyclability test. It is observed that a little change in the tensile modulus, flexural strength and HDT of first recycled composites occurred compared to the non-recycled (0 recycled) material. Almost no change in the properties was observed for first, second and third time recycled materials.

TABLE 4

Recyclability of Bioplastic Materials

| Number of Recycles of 99% Base material* + 1% PMDI | Tensile Strength (MPa) | Tensile Modulus (GPa) | Flexural Strength (MPa) | Flexural Modulus (GPa) | HDT (° C.) |
|---|---|---|---|---|---|
| 0 | 35.0 ± 2.6 | 2.6 ± 0.05 | 63 ± 0.1 | 2.7 ± 0.1 | 108.8 |
| 1 | 34.1 ± 0.7 | 2.3 ± 0.05 | 59.8 ± 0.7 | 2.65 ± 0.04 | 103.2 |
| 2 | 34.2 ± 0.9 | 2.4 ± 0.04 | 60.4 ± 0.6 | 2.75 ± 0.01 | 104.4 |
| 3 | 34.3 ± 0.6 | 2.4 ± 0.02 | 59.5 ± 0.8 | 2.72 ± 0.07 | 104.5 |

*Base material = 50% Hybrid filler (1:4 lignin:Switchgrass) + 50% PBS (1:1PBS 1020:PBS 1001).

The above disclosure generally describes the present invention. Changes in form and substitution of equivalents are contemplated as circumstances may suggest or render expedient. Although specific terms have been employed herein, such terms are intended in a descriptive sense and not for purposes of limitation. Other variations and modifications of the invention are possible. As such modifications or variations are believed to be within the sphere and scope of the invention as defined by the claims appended hereto.

REFERENCES

1. J. Li, Y. He, and Y. Inoue, Polym. Intl. 52, 949 (2003).
2. M. Shigematsu, M. Morita, I. Sakata, and M. T anahashi, Macromol. Chem. Phys. 195, 2827 (1994).
3. M. N. Satheesh Kumar, A. K. Mohanty, L. Erickson and M. Misra, J. of Biobas. Mat. Bioen., 3, 1 (2009)
4. D. K. Setua, M. K. Sukla, V. Neegam, H. Singh, and G. Mathur, Polymer Composites, 21 [6], 988 (2000).
5. H. D. Rozman, K. W. Tan, R. N. Kumar, A. Abubakar, J. Appl. Polym. Sci., 81, 1333 (2001).
6. B. A. Acha, N. E. Marcovich and M. M. Reboredo, J. Appl. Polym. Sci., 113 [3], 1480, (2009).
7. S. Baumberger, C. Lapierre, B. Monties, J. Agric. Food Chem., 46 [6], 2234 (1998).
8. J-M Raquez, R. Narayanan, P. Dubois., Macromol. Mater. Engineering. 293, 447 (2008).
9. K. Weihua, Y. He, N. Asakawa, Y. Inoue, J. Appl. Polym. Sci. 94[6]: 2466 (2004).
10. Graupner, Journal of Materials Science 43, (15), 5222 (2008).
11. J.; Li, Y. He, Y. Inoue, Polym. International, 52, 949 (2003).
12. Chen-Feng Kuan, Chen-Chi M. Ma, Hsu-Chiang. Kuan, Han-Lang Wu, Yu-Mei Liao, Composites Science and Technology. 66 (13), 2231 (2006).
13. L. Liu, J. Yua, L. Cheng, W. Qu, Composites Part A: Applied Science and Manufacturing. 40[5], 669-674 (2009).
14. S. M. Lee, D. Cho, W. H. Park, S. G. Lee, S. Ok. Han, L. T. Drzal, 'Composites Science and Technology. 65(3-4), 647 (2005).
15. M. J. A. Van den Oever, H. W. Elbersen, E. R. P. Keijsers, R. J. A. Gosselink, B. de. Klerk-Engels, J. Mat. Sci., 38 (18), 3697 (2003).
16. M. Mičušik, M. Omastová, Z. Nógellová, P. Fedorko, K. Olejniková, M. Trchová, I. Chodák, European Polymer Journal., 42 [10], 2379 (2006).
17. J. Bendzala, and B. V. Kokta, 'The properties of LLDPE filled with fast-growing grass' 2nd International Wood and Natural Fiber Composites Symposium Jun. 28-29, 1999 in Kassel/Germany.

18. L. Jiang, F. Chen, J. Qian, J. Huang, M. Wolcott, L. Liu, J. Zhang, Ind. Eng. Chem. Res., 49, 572 (2010).
19. F. Chen, L. Liu, P. H. Cooke, K. B. Hicks, J. Zhang, Ind. Eng. Chem. Res., 47, 8667 (2008).
20. M. J. John, R. D. Anandjiwala, S. Thomas, 'Hybrid composites'. 2009. Hybrid composites. (Chapter 12), Natural fiber reinforced polymer composites: macro to nanoscale, pp 315-328, Fibers and Textiles, General Science, Engineering & Technology.
21. B. M. P. Ferreira, C. A. C. Zavaglia, E. A. R. Duek, J. Appl. Polym. Sci., 86, 2898 (2002).
22. M. Harada, T. Ohya, K. Iida, H. Hayashi, K. Hirano, H. Fukuda, J. Appl. Polym. Sci., 106, 1813 (2007).
23. S. Lee and J. W. Lee, Korea-Australia Rheol. Journal, 17(2), 71 (2005).
24. R. Burgueno, M. J. Quagliata, A. K. Mohanty, G. Mehta, L. T. Drzal, M. Misra, Composites: Part A, 36, 581 (2005).
25. M. S. Huda, L. T. Drzal, A. K. Mohanty, M. Misra, Composites: Part B, 38, 367 (2007).
26. S. Singh and A. K. Mohanty, 280—Bioproducts and Biomaterials—Critical Products for a Sustainable Economy III (17007), Forest Products Division, (2007) AICHE Annual Meeting, http://aiche.confex.com/aiche/2007/techprogram/P96595.HTM
27. Panthapulakkal, S.; Sain, M. 'J. Appl. Polym. Sci., 103, 2432 (2007).

The invention claimed is:

1. A plastic material characterized in that said plastic material comprises lignin, poly(butylene succinate) (PBS), and a grass fiber selected from the group consisting of switchgrass, miscanthus, and hemp and wherein said plastic material comprises more than 70% by weight lignin.

2. The plastic material of claim 1 characterized in that said plastic material further comprises one or more plastic additives.

3. The plastic material of claim 1 characterized in that said plastic material further comprises one or more biofillers.

4. The plastic material of claim 1, characterized in that said plastic material further comprises one or more plastic additives and one or more biofillers.

5. The plastic material according to claim 1, characterized in that said plastic material further comprises one or more additives selected from the group consisting of: epoxidized soy bean oil, polymeric methylene diphenyl diisocyanate (PMDI), methylene diphenyl diisocyanate polybutadiene prepolymer, 2,5-Bis(tert-butylperoxy)-2,5-dimethylhexane, titanate and silane.

6. The plastic material of claim 1 characterized in that said PBS is provided as a blend of PBS and poly(3-hydroxybutyrate-co-3-hydroxyvalerate) (PHBV).

7. The plastic material of claim 1 characterized in that said plastic material further comprises polylactic acid (PLA).

8. The plastic material of claim 1 characterized in that said plastic material exhibits a simultaneous increase in mechanical and thermo-mechanical properties of the plastic material with an increase of the lignin content in the plastic material, said mechanical and thermo-mechanical properties including heat deflection temperature (HDT), storage modulus, tensile strength, tensile modulus, flexural strength and flexural modulus.

9. The plastic material of claim 1 characterized in that said plastic material exhibits at least one of the following properties: flexural strength of about 35 MPa to about 75 MPa, tensile strength of about 25 MPa to about 45 MPa, tensile modulus of about 1 GPa to about 3.4 GPa, impact strength of about 10 J/M to about 60 J/M, storage modulus of about 1.22 GPa to about 3.8, flexural modulus of about 1 GPa to about 3.8 GPa and heat deflection temperature (HDT) of about 75 degrees Celsius to about 110 degrees Celsius.

10. The plastic material of claim 1 characterized in that said plastic material further comprises epoxidized soy bean oil (ESO).

11. The plastic material of claim 1 characterized in that said plastic material further comprises PMDI and methylene diphenyl diisocyanate polybutadiene prepolymer.

12. The plastic material of claim 1 characterized in that said plastic material further comprises PMDI and ESO.

13. The plastic material of claim 1 characterized in that said plastic material further comprises PMDI, ESO and methylene diphenyl diisocyanate polybutadiene prepolymer.

14. A degradable and compostable molded article characterized in that said molded article is obtained by molding the plastic material of claim 1.

15. A method of controlling the mechanical and thermo-mechanical properties of a plastic material, said mechanical and thermo-mechanical properties including impact strength, HDT, storage modulus, tensile modulus, flexural strength tensile strength and tensile modulus, said plastic material comprising lignin, a grass fiber a grass fiber selected from the group consisting of switchgrass, miscanthus, and hemp, poly (butylene succinate) (PBS), polymeric methylene diphenyl diisocyanate (PMDI) and 2,5-Bis(tert-butylperoxy)-2,5-dimethylhexane, characterized in that said method comprises:
  a. mixing an amount of lignin and the grass fiber to create a mixture,
  b. adding PBS, polymeric methylene diphenyl diisocyanate (PMDI) and 2,5-Bis(tert-butylperoxy)-2,5-dimethylhexane to the mixture,
    wherein the properties of the plastic material is controlled by increasing or reducing the amount of lignin content of said mixture.

16. A plastic material characterized in that said plastic material comprises more than 70% by weight lignin and poly(butylene succinate) (PBS).

17. The plastic material of claim 16, wherein the plastic material further comprises a grass fiber.

18. A plastic material characterized in that said plastic material comprises lignin, poly(butylene succinate) (PBS), a grass fiber selected from the group consisting of switchgrass, miscanthus, hemp and kenaf, polymeric methylene diphenyl diisocyanate (PMDI) and 2,5-Bis(tert-butylperoxy)-2,5-dimethylhexane.

19. A plastic material characterized in that said plastic material comprises lignin, poly(butylene succinate) (PBS), a grass fiber selected from the group consisting of switchgrass, miscanthus, hemp and kenaf, polymeric methylene diphenyl diisocyanate (PMDI), methylene diphenyl diisocyanate polybutadiene prepolymer, and 2,5-Bis(tert-butyl peroxy)-2, 5-dimethylhexane.

20. A method of controlling the mechanical and thermo-mechanical properties of a plastic material, said mechanical and thermo-mechanical properties including impact strength, HDT, storage modulus, tensile modulus, flexural strength tensile strength and tensile modulus, said plastic material comprising lignin, a grass fiber a grass fiber selected from the group consisting of switchgrass, miscanthus, and hemp, and poly (butylene succinate) (PBS), characterized in that said method comprises:
  a. mixing an amount of lignin and the grass fiber to create a mixture, said amount of lignin being more than 70% by weight of the plastic material,
  b. adding PBS to the mixture,
  wherein the properties of the plastic material is controlled by increasing or reducing the amount of lignin content of said mixture.

* * * * *